(No Model.)
M. M. BROPHY.
KNOB ATTACHMENT.
No. 503,228. Patented Aug. 15, 1893.
Fig. 1.
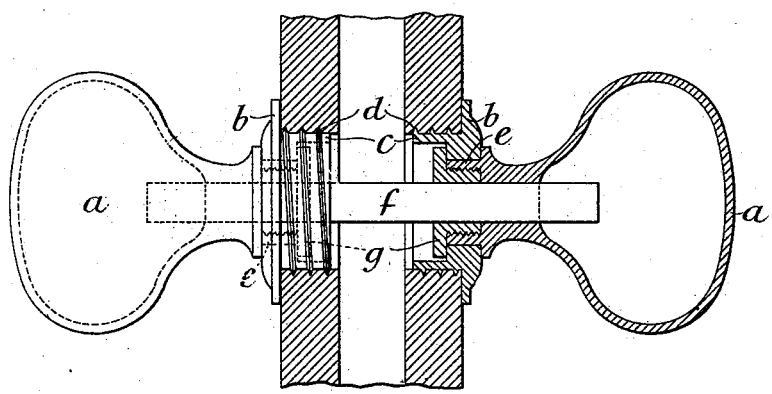
Fig. 2.
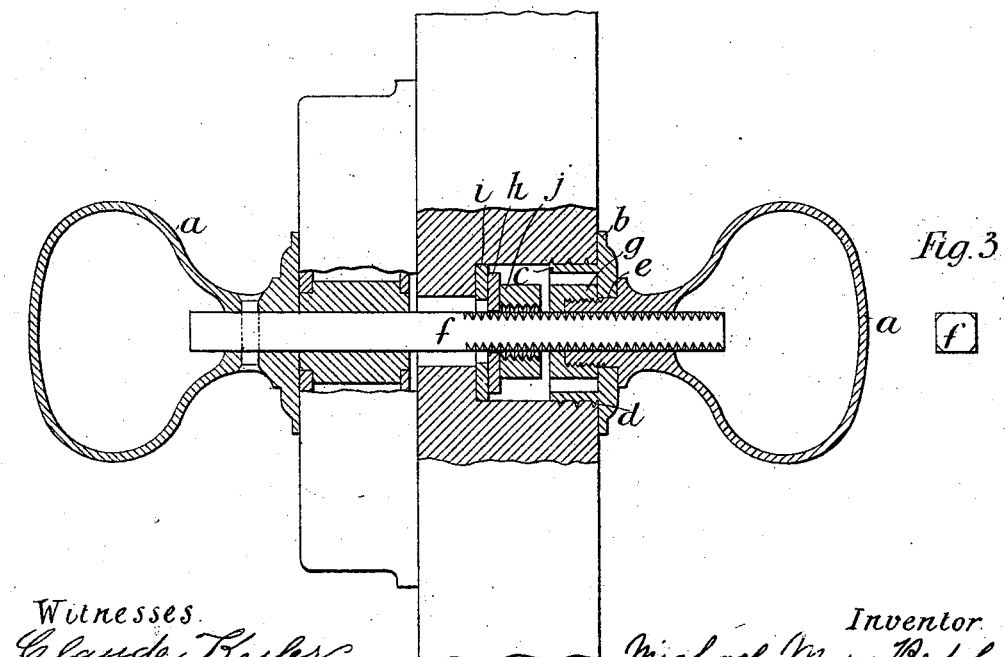
Fig. 3
Witnesses
Claude Kesler
Jeremiah Ensight
Inventor
Michael Mary Brophy.
By John J. Halsted & Son
his Attorneys

UNITED STATES PATENT OFFICE.

MICHAEL MARY BROPHY, OF LONDON, ENGLAND.

KNOB ATTACHMENT.

SPECIFICATION forming part of Letters Patent No. 503,228, dated August 15, 1893.

Application filed May 24, 1892. Serial No. 434,233. (No model.)

*To all whom it may concern:*

Be it known that I, MICHAEL MARY BROPHY, a subject of the Queen of Great Britain, residing at London, England, have invented new and useful Improvements in or Connected with Door Knobs and Spindles, of which the following is a specification.

My invention has for its object to enable door knobs or handles to be attached more firmly than heretofore.

According to my invention a door-knob is permanently connected to the rose, and the rose itself is provided with a screw-threaded cylinder adapted to be fixed by screwing it into a suitable aperture in the door. The knob or handle is connected to the rose by means of a flanged nut screwed into the hollow inside end of the knob and formed with a hole corresponding with the shape of the spindle so that, when the spindle is passed through the nut into the handle, the said nut cannot turn relatively to such handle.

To enable my invention to be fully understood I will describe the same by reference to the accompanying drawings, in which—

Figure 1 is a view showing two knobs, one of which is in elevation and the other in section, connected to a door in accordance with my invention; and Fig. 2 is a sectional view showing how my invention may be used in connection with a rim lock. Fig. 3 is a view of a detail.

Similar letters of reference indicate corresponding parts in the several figures.

$a, a$ indicate the door-knobs.

$b, b$ indicate the roses thereof, each of which is formed with a cylindrical portion $c$ having a screw-thread $d$ thereon and provided with a central hole into which the turned portion $e$ of the handle fits, and $f$ indicates the lock spindle which fits into a correspondingly shaped hole in each handle.

$g$ is the nut by means of which each handle is connected with a rose. As shown in Fig. 1 this nut is screwed into a corresponding screw-thread formed within the portion $e$ of the handle, while in the arrangement shown in Fig. 2 it is screwed onto screw-threads formed on the exterior of the said portion $e$. As hereinbefore stated the nut is provided with a hole of the same shape as the spindle so that when the nut is screwed up and the spindle is passed therethrough into the handle the said nut cannot move relatively with the handle.

The method of attaching the handle is as follows, that is to say:—After the handle has been connected with the rose by means of the nut, the said rose is screwed into a suitably formed hole in the door, as shown in Fig. 1, the said rose being provided with holes or otherwise suitably shaped to permit of the engagement of a wrench or spanner therewith.

As hereinbefore stated when the door-knobs arranged as described are used in connection with a mortise-lock, the knob on each side of the door may be fixed in accordance with my invention, as shown in Fig. 1. When, however, my handle is to be used in connection with a rim-lock, as shown in Fig. 2, the handle of which is connected to the spindle at one end, I provide for preventing the spindle from being withdrawn from the knob upon the other side of the door and for this purpose I fit upon the spindle a collar $h$ having a hole of the same shape as the spindle so as to turn therewith and bearing against a disk or washer $i$ within the door, and in which the spindle turns freely the said collar $h$ being adjustable relatively to the washer $i$ by means of a nut $j$ screwed upon the spindle $f$, an end view of which is shown at Fig. 3.

Having now particularly described and ascertained the nature of my said invention and in what manner the same is to be performed, I declare that what I claim is—

1. A door-knob permanently connected to the rose, and the rose itself provided with a screw-threaded cylinder adapted to be fixed by screwing it into a suitable aperture in the door, the knob or handle being connected to the rose by a flanged nut, and made with a hole corresponding with the shape of the spindle, so that when the spindle is passed through the nut into the handle the said nut can not turn relatively to the handle.

2. The combination with a door-knob permanently connected with a rose having a cylindrical screw-threaded portion as described, of a screw-threaded spindle having the collar $h$ and the nut $j$ thereon, substantially as described.

MICHAEL MARY BROPHY.

Witnesses:
 G. F. REDFERN,
 JOHN E. BOUSFIELD,
*Of the firm of G. F. Redfern & Co., 4 South Street, Finsbury, London, Patent Agents.*